United States Patent [19]
Termet

[11] Patent Number: 4,686,786
[45] Date of Patent: Aug. 18, 1987

[54] CARTRIDGE LOADING AND FEEDING ARRANGEMENT FOR EXPLOSIVE CHARGE OPERATED DEVICE

[76] Inventor: Pierre Termet, "Le Vieux Moulin", 01820 Villebois, France

[21] Appl. No.: 837,728

[22] Filed: Mar. 10, 1986

[30] Foreign Application Priority Data

Mar. 8, 1985 [FR] France .................................. 8503417

[51] Int. Cl.⁴ .......................... A22B 3/02; F41C 25/10
[52] U.S. Cl. ......................................... 42/1.12; 42/13; 42/33
[58] Field of Search ....................... 42/1.12, 11, 12, 13, 42/1.14, 1.11, 6, 106, 14, 33; 17/1 B; 227/10, 9

[56] References Cited

U.S. PATENT DOCUMENTS 3,520,400 7/1970 Gates ....................................... 206/3
3,755,948 9/1973 Hemicke ................................. 42/106

FOREIGN PATENT DOCUMENTS 1553445 12/1968 France .
2426543 12/1979 France .
2120918 12/1983 United Kingdom ................... 17/1 B Primary Examiner—Deborah L. Kyle
Assistant Examiner—Michael J. Carone
Attorney, Agent, or Firm—Parkhurst & Oliff

[57] ABSTRACT

A cartridge feed arrangement for an apparatus operating by means of an explosive charge and a loader to feed the apparatus.

The invention relates to a cartridge feed device for an apparatus operating by means of an explosive charge, of the type in which, after unlocking the breech (4), the barrel (2) can be pivoted with respect to the breech (4) around an axis parallel to that of the gun barrel so as to bring into alignment with the axis of the cartridge chamber (6) a passage (5) containing a line of cartridges (14).

The cartridges (14) are arranged in parallel lines in an annular space (7) located on the periphery of the breech (4). One line of cartridges being in a position such that after unlocking the breech (4) and pivoting the barrel (2) with respect to it, said line is located in the axis of the cartridge chamber (6). An appropriate device (18, 19) including a one way clutch means allow the different lines of cartridges to come successively into the axis of the feed passage (5) of the cartridge chamber (6) of the barrel (2).

9 Claims, 6 Drawing Figures

U.S. Patent    Aug. 18, 1987    Sheet 1 of 2    4,686,786
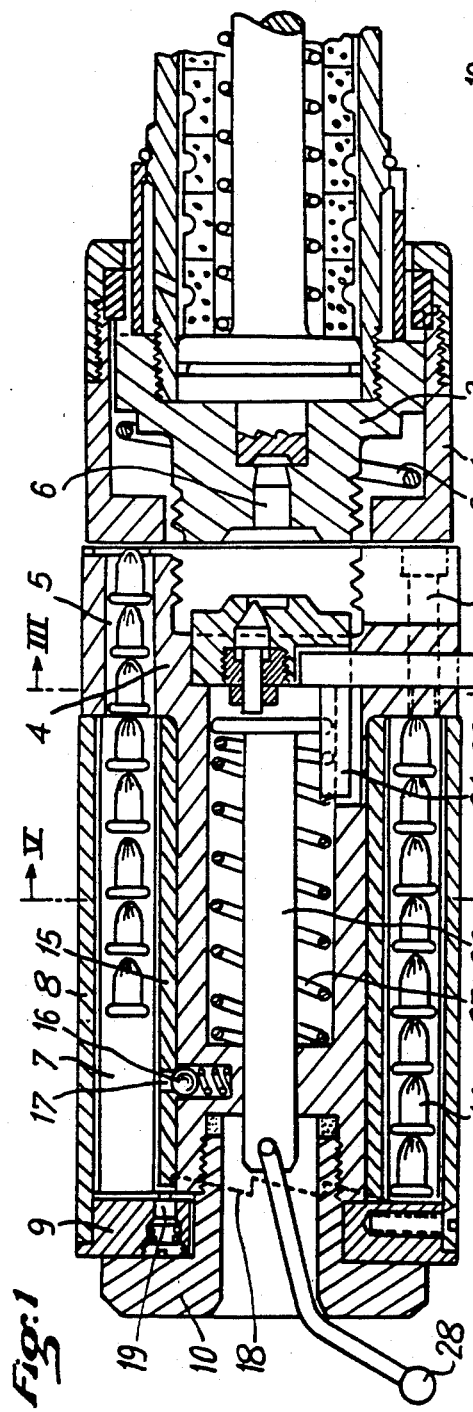
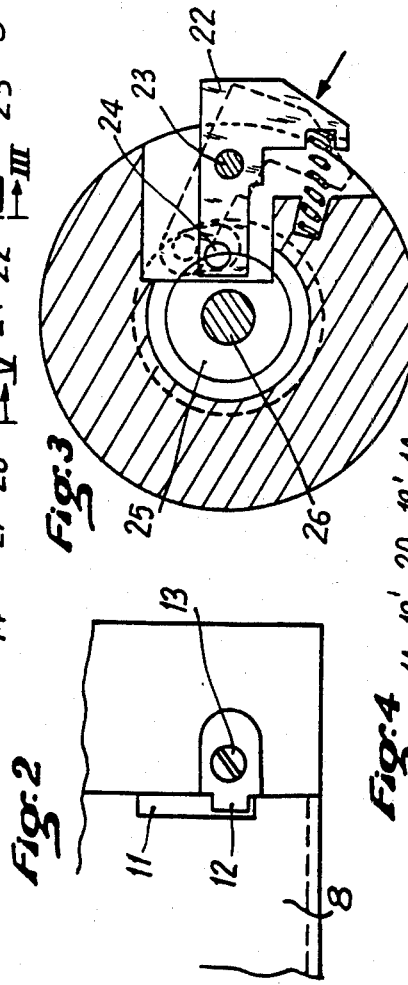
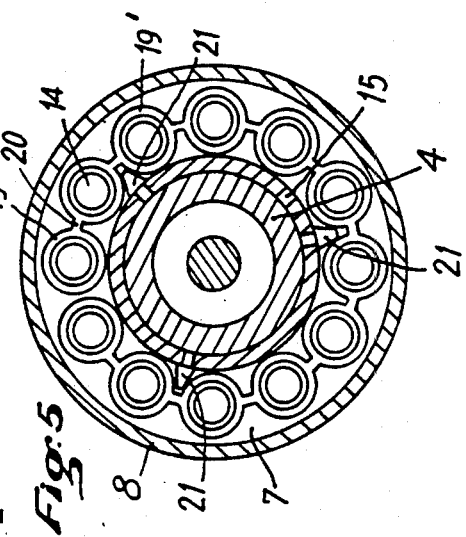

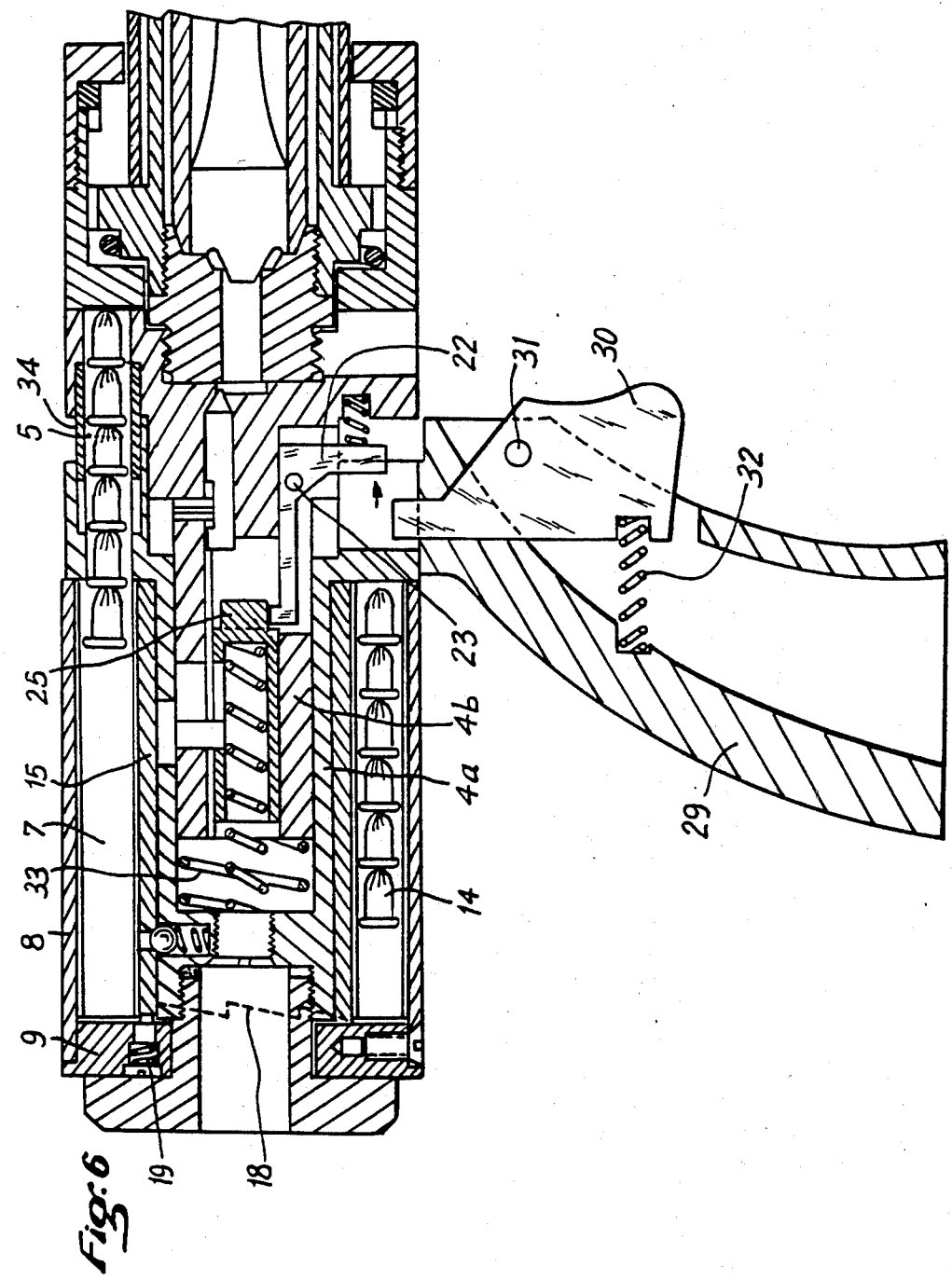

CARTRIDGE LOADING AND FEEDING ARRANGEMENT FOR EXPLOSIVE CHARGE OPERATED DEVICE

The present invention relates to a novel cartridge feeding device for an apparatus operating by means of an explosive charge, such as, for example, a fastener or nail setting or driving gun, or cattle slaughtering apparatus.

The invention also relates to a loader arrangement for loading cartridges into this device.

The invention relates to apparatus of the type in which, after the barrel has been disengaged from the breech by an unlocking movement, the breech can pivot with respect to the barrel around an axis parallel to the barrel axis to align a feed passage containing a line of cartridges with a cartridge chamber at the rear of the barrel to thus feed a cartridge into the chamber, and then, by an opposite or return movement, the breech is aligned with the barrel and can be locked to fire the cartridge. A mechanism which loads in this manner is disclosed in U.S. Pat. No. 4,531,322 which is incorporated herein by reference.

The present invention provides apparatus of this type which is simple to make, not bulky, and easy to use.

The present invention has as its object a cartridge supply device for an apparatus functioning by means of an explosive charge of the type in which, after the breech is unlocked, the breech can be pivoted with respect to the barrel around an axis parallel to the barrel, so as to bring into alignment with the axis of the cartridge chamber, a passage containing a line of cartridges, characterized by the fact that the cartridges are arranged in parallel lines in an annular space or magazine located on the periphery of the breech, one line of cartridges being in one position such that after unlocking the breech and pivoting the breech with respect to the barrel, the line is located in the axis of the cartridge chamber, and a mechanism is provided to cause the different lines of cartridges to move successively in the direction of the feed passage for feeding cartridges to the cartridge chamber of the barrel.

In one preferred embodiment of the invention, the cartridges are placed in a loader belt or band, for example of a plastic material, which includes a series of tubes each able to receive a line of cartridges, the tubes being flexibly interconnected so that the belt can be curved to be placed in the annular space around the breech.

In another preferred embodiment of the invention, the cartridges are placed in a loader including a succession of tubes, each receiving a line of cartridges, and which are interconnected to form a somewhat rigid configuration of cylindrical shape.

This loader band and this loader are also objects of the invention.

According to one preferred embodiment of the invention, the annular space which receives the lines of cartridges includes an outer side wall whose diameter is basically the same as that of the front portion of the breech, and which is able to revolve about the breech through an angle which corresponds essentially to the angular distance between the axes of adjacent cartridge lines.

The inner wall of the annular space which receives the lines of cartridges is able to rotate or revolve around the breech of the apparatus, and a holding means such as a ball and spring detent hold this inner wall in predetermined indexed angular positions. The lines of cartridges are spaced angularly and connected to the inner side wall such that, a line of cartridges is always located in the axis of the feed passage, after unlocking the breech, to allow the cartridges to be brought into the axis of the cartridge chamber.

A ratchet device is provided such that, when the outer side wall of the annular space containing the lines of cartridges is alternately rotated, the inner wall, and the lines of cartridges which are connected to it, move and index from one line of cartridges to another during rotation of the outer wall in one direction, but do not move during rotation of the outer wall in the other direction.

It will be understood that it is thus possible, when a cartridge has been fired and after the barrel has been unlocked from the breech, to manipulate the outer side wall of the angular space containing the lines of cartridges, and to bring another line of cartridges into the axis of the feed passage, for the cartridge chamber located in the barrel.

This movement of rotation of the outer side wall of the annular space which contains the lines of cartridges can also be used to cause the breech to pivot in either direction with respect to the barrel after unlocking the barrel.

The present invention can also be used with apparatus used, for example, for slaughtering livestock or cattle, which do not have a pistol grip or stock, and which are held by the outer cylindrical part of the breech, as well as for apparatus with a grip, which are commonly used to fasten pins or spikes in various materials.

According to the invention, it is desirable to place the trigger or the firing lever near the hammer to keep this device from interfering with the loader conforming to the invention.

This can, for example, be achieved, in the case of an apparatus without a pistol grip, by means of a firing lever pivoting about an axis parallel to the barrel axis which, in the rest position, prevents the spring-activated hammer from striking the firing pin. Firing is easily accomplished by swinging the firing lever which thus frees the hammer.

In order to make the invention better understood, several embodiments taken as examples will now be described by way of illustration and with non-limiting character, and which are shown on the accompanying drawings.

BRIEF DESCRIPTION OF DRAWINGS

FIG. 1 is a longitudinal section of the breech and the rear portion of the barrel of an apparatus for slaughtering and includes the cartridge supply device according to the invention;

FIG. 2 is a schematic top view of a portion of FIG. 1, showing an arrangement which limits the extent of angular or rotational displacement of the outer side wall of the annular space containing the lines of cartridges;

FIG. 3 is a view in section along line III—III of FIG. 1;

FIG. 4 is an end view of a cartridge loader belt or band;

FIG. 5 is a view in section along line V—V of FIG. 1; and

FIG. 6 is a view in longitudinal section of the rear portion of a barrel and of the breech and pistol grip of a stud or pin setting apparatus, provided with a cartridge supply according to the invention.

DETAILED DESCRIPTION

FIG. 1 shows a barrel support 1 inside which slides the rear portion of a barrel 2, which is constantly urged toward the right (as viewed at FIG. 1) by a spring 3, so as to separate the barrel from the breech and move it to the right, at least to the junction plane of breech 4 and barrel holder 1, after the barrel is unlocked from the breech.

In the unlocked position, the barrel 2 can, in the usual way, pivot with respect to the breech 4 around an axis parallel to the barrel axis, but which is offset with respect to the barrel axis, to bring the axis of a feed tube 5 into alignment with the axis of a cartridge chamber 6 at the rear of the barrel.

According to the invention, the cartridges are placed in an annular space 7, at the outer periphery of breech 4.

This annular space 7, which forms a magazine, is defined by an outer side wall 8, and a base plate 9 secured to an end of the side wall. The assembly of outer side wall 8 and base plate 9 is removably connected to the breech by a hollow threaded plug 10 screwed into the breech. The assembly of outer side wall 8 and base plate 9 is so mounted as to be able to rotate freely with respect to breech 4.

However, as shown at FIG. 2, outer side wall 8 has a recess 11, and a lug 12 connected to breech 4 by a screw 13, extends into the recess 11. The dimensions of recess 11 and lug 12 are such that the maximum angular displacement of outer side wall 8 corresponds essentially to the angular distance between the axes of the lines of cartridges 14 in annular space 7.

Space 7 also has an inner wall 15 which is able to revolve freely around an outer cylindrical portion of breech 4.

The breech 4 has a small ball detent 16 pressed by a spring to engage in any one of a series of openings or recesses 17 on the periphery of inner wall 15. These openings 17 are in the same plane perpendicular to the axis of the inner wall 15, and have an angular spacing corresponding to the angular spacing between the axes of adjacent lines of cartridges 14.

It will be understood that, by means of this ball detent 16 which engages in holes 17, indexing of inner wall 15 is achieved which corresponds to the alignment of any given line of cartridges 14 with the axis of feed tube 5.

The left hand end of inner wall 15 has ratchet teeth 18, as shown in dotted lines on FIG. 1. Base 9, attached to outer side wall 8, has a spring catch or pawl 19 which coacts with ratchet teeth 18, so that when side wall 8 is rotated in one direction, inner wall 15 is driven in the same direction, but when side wall 8 is rotated in the other direction, inner wall 15 is immobilized by the ball detent 16.

It will also be understood that, after barrel 2 is unlocked by gripping the barrel in one hand and outer side wall 8 in the other hand and rotating the barrel, the barrel 2 can first be pivoted with respect to breech 4, while cartridges 14 remain immobile with respect to breech 4, and pawl 19 slides over a following tooth of ratchet 18. A cartridge 14 is then introduced by gravity into cartridge chamber 6 which by the previous pivoting movement has been brought into alignment with feed passage 5. Barrel 2 is pivoted in the opposite direction to bring it back into alignment with the axis of breech 4 and the breech is locked by continuing the pivoting or rotational movement of the barrel. Rotation of outer side wall 8 occurs at the end of the the pivoting or rotation, which brings a new line of cartridges into alignment with the axis of the feed passage, by the driving action of the pawl 19 on a ratchet tooth.

FIGS. 4 and 5 also show the arrangement of the loader belt or band. As can be seen at FIG. 4, this belt is constituted of a series of tubes 19' which each hold a line of cartridges 14, and which are interconnected by connection portions 20.

Tubes 19' and portions 20 are preferably made of a plastic material, so that the belt is flexible, and can have the circular shape shown on FIG. 5.

FIG. 5 shows the annular space which is defined by outer side wall 8, and inner wall 15 which can rotate around breech 4.

FIG. 5 also shows tubes 19' which contain the lines of cartridges 14, and the connection portions 20.

In another embodiment tubes 19' are rigidly interconnected by portions 20 so the belt has a circular configuration.

In one preferred embodiment of the invention, tubes 19' are permanently closed at one end to facilitate loading shells into the tubes, and a removable cover or closure, for example, constituted of a self-sticking sheet or tape, is placed over the other end of the cartridge filled tubes and is removed when the loader is placed in the apparatus according to the invention.

Outer side wall 8 and the loader tubes 19' are preferably made of a transparent plastic material so that the cartridges contained in the loader are visible.

As is apparent from the explanation above, it is necessary for the lines of cartridges 14 to be properly angularly positioned around, and connected to rotate with inner wall 15 of annular space 7, which contains them. This can be accomplished by various means. In the embodiment of FIG. 5, there are provided, on the outer periphery of inner wall 15, studs 21 which engage between two adjacent tubes 19' thus ensuring the proper index positioning of the lines of cartridges with respect to wall 15. These studs are so arranged that the connected tubes can be slid in position around the inner wall 8.

FIG. 3 shows the firing mechanism which, in this embodiment, is constituted of a lever pivotal around an axle or pin 23 and which is provided with a sear bar 24 which engages the front of head 25 of striking hammer 26 which is constantly thrust forward by spring 27. A compression spring, shown on FIG. 3, continually pushes the firing lever toward the position in which bar 24 moves in front of head 25 of hammer 26, and thus holds the hammer ready for firing. When lever 22 is pressed, the hammer is released and fires the cartridge.

In the position shown on FIG. 1, a cartridge has recently been fired, the breech 4 has been unlocked and the spent shell of the cartridge has been ejected. The head 25 of the hammer 26 has not yet been drawn rearwardly to compress spring 27, so that bar 24 of the firing lever presses laterally against the side of head 25 of the hammer.

After a cartridge is engaged in cartridge chamber 6 and the breech has been relocked, it is only necessary, by means of a pull-rod 28, to load or cock the hammer so that its head 25 moves beyond the end of bar 24 which then moves in front of head 25, by virtue of the pivoting of sear lever 22 under the action of its compression spring.

It will be understood that it is then sufficient to press on the firing lever 22 in the direction of the arrow of FIG. 3 for the hammer to be freed, and the cartridge to be fired.

The broken lines on FIG. 3 show the position of lever 22 when it is rotated to the firing position.

FIG. 6 shows a cut-away view of a nail or stud driving gun having a pistol grip and a cartridge supply according to the invention.

FIG. 6 shows many of the parts which were described with reference to FIG. 1.

However, the device of FIG. 6 includes a breech made in two parts 4a and 4b which can slide axially with respect to each other and provide a safety feature. To fire a cartridge, it is necessary that there be applied to pistol grip 29, connected to the part 4a of the breech, sufficient force to compress spring 33 which constantly forces part 4b of the breech toward the right.

When this force is exerted, part 4a of the breech and the pistol grip move to the right so that when trigger 30 is swung around its axle 31, compressing spring 32, the end of trigger 30 engages the firing lever 22, and pressure is exerted in the direction of the arrow on firing lever 22 which rotates around its axle 23 and releases hammer 25, to strike the firing pin and cause firing of the cartridge.

The force to move the pistol grip and portion 4a of the breech to the right will usually result from pressing the free end (not shown) of the barrel, with a stud or nail therein, against the surface into which the nail is to be driven.

To compensate for this relative movement of the two parts 4a and 4b of the breech, feed passage 5 has a sliding tube 34 which ensures continuous guiding of the cartridge without regard to variations in the length of this passage.

The operation of this apparatus is the same as for the apparatus of FIG. 1, in that the loading manipulation is carried out with one hand on the barrel and one hand on outer side wall 8 which surrounds the breech.

It will be seen that, according to the invention, it is possible to position on the periphery of the breech, while keeping a diameter for this latter which is basically equal to the diameter of the rear portion of the barrel, (that is, with only a slight encumbrance), a large number of cartridges, for example about one hundred, which can be stored in the form of belts and which can easily be loaded into the annular opening 7 by simple unscrewing of plug 10.

It will also be seen that, by means of a simple maneuver corresponding to the natural movement to unlock the barrel from the breech and to bring the feed passage 5 opposite the cartridge chamber, successive rotations are caused to bring each of the lines of cartridges successively into the axis of the feed passage, so that the lines of cartridges are used successively, which has the advantage of progressively using the cartridges of each line.

It is of course understood that the embodiments described above are given as non-limiting examples, and any desirable modification can be made without exceeding the scope of the invention.

In particular, it is clear that the holder for the lines of cartridges in the axis of the feed passage can be made in a different way from that which has been described, and the structure of the ratcheting device, which allows the cartridges to be pivoted through a corresponding angle to bring a new line of cartridges into the axis of the feed passage, can also be changed.

I claim:

1. A cartridge supply device for an apparatus having a barrel and a breech and operating by means of an explosive charge, and of the type in which, after unlocking the breech, the barrel can be pivoted with respect to the breech around an axis parallel to the barrel axis to a loading position in which a cartridge chamber of the barrel is aligned with a feed passage containing at least one cartridge, to feed a cartridge into the chamber from the passage, said cartridge supply device comprising an outer side wall located at the periphery of the breech and an inner side wall which is able to rotate around the breech defining an annular space around the periphery of the breech for containing a plurality of parallel lines of cartridges, said outer side wall being able to pivot with respect to the breech through an angle which corresponds to the angular distance between two lines of cartridges, elastic means retaining said inner side wall in a plurality of positions in each of which one line of cartridges is aligned with the feed passage and the cartridge chamber in the loading position, means for connecting said lines of cartridges to said inner side wall for rotation with said inner side wall, ratchet means comprising a ratchet pawl on one of said outer or inner sidewalls of said annular space and a crownratchet on the other side wall of said annular space, said pawl engaging said crown ratchet to drive said inner side wall in only one direction in response to alternating rotations of said outer side wall.

2. Apparatus according to claim 1, in which the elastic means retaining said inner side wall in a plurality of positions comprises a spring and ball detent on said breech and a plurality of recesses on said inner side wall, said detent engaging in said recesses to maintain the inner side wall in said plurality of positions.

3. Apparatus as claimed in claim 1 in which the ratchet pawl is located on said outer side wall and the crown ratchet is located on said inner side wall of said annular space.

4. Apparatus according to claim 3, in which the elastic means retaining said inner side wall in a plurality of positions comprises a spring and ball detent on said breech and a plurality of recesses on said inner side wall, said detent engaging in said recesses to maintain the inner side wall in said plurality of positions.

5. In combination with the apparatus according to claim 1, a band loader comprising a plurality of tubes, each containing a line of cartridges, said tubes being flexibly interconnected so that said loader can be introduced in said annular space around the breech.

6. In combination with the apparatus according to claim 3, a band loader comprising a plurality of tubes, each containing a line of cartridges, said tubes being flexibly interconnected so that said loader can be introduced in said annular space around the breech.

7. In combination with the apparatus according to claim 2, a band loader comprising a plurality of tubes, each containing a line of cartridges, said tubes being flexibly interconnected so that said loader can be introduced in said annular space around the breech.

8. In combination with the apparatus according to claim 4, a band loader comprising a plurality of tubes, each containing a line of cartridges, said tubes being flexibly interconnected so that said loader can be introduced in said annular space around the breech.

9. A cartridge supply device for an apparatus having a barrel and a breech and operating by means of an explosive charge, and of the type in which, after unlocking the breech, the barrel can be pivoted with respect to the breech around an axis parallel to the barrel axis to a loading position in which a cartridge chamber of the barrel is aligned with a feed passage containing at least one cartridge, to feed a cartridge into the chamber from the passage, said cartridge supply device comprising an outer side wall located at the periphery of the breech and an inner side wall which is able to rotate around the breech defining an annular space around the periphery of the breech for containing a plurality of parallel lines of cartridges, said outer side wall being able to pivot with respect to the breech through an angle which corresponds to the angular distance between two lines of cartridges, elastic means retaining said inner side wall in a plurality of positions in each of which a line of cartridges is aligned with the feed passage and the cartridge chamber in the loading position, means for connecting said lines of cartridges to said inner side wall for rotation with said inner side wall, one way clutch means between said outer and inner sidewalls to drive said inner side wall in only one direction in response to alternating rotations of said outer side wall, said outer side wall providing means for gripping the apparatus at the breech so that the action of loading a cartridge into the breech causes manual rotation of the outer side wall to in turn rotate the inner side wall to align a different line of cartridges with the feed passage after each loading.

* * * * *